United States Patent [19]
Bolhofner

[11] Patent Number: 4,472,284
[45] Date of Patent: Sep. 18, 1984

[54] TREATMENT OF WATER CONTAINING FATS, OILS AND GREASES

[75] Inventor: Kenneth R. Bolhofner, Crown Point, Ind.

[73] Assignee: Drew Chemical, Parsippany, N.J.

[21] Appl. No.: 60,454

[22] Filed: Jul. 25, 1979

Related U.S. Application Data

[63] Continuation of Ser. No. 854,462, Nov. 23, 1977, abandoned.

[51] Int. Cl.³ .................................................. C02F 1/56
[52] U.S. Cl. .................................... 210/708; 210/728; 210/735; 210/916
[58] Field of Search ............... 210/42 R, 43, 44, 49, 210/51-54, 59, 725, 727, 728, 735, 734, 916, 708; 252/358; 422/5

[56] References Cited

U.S. PATENT DOCUMENTS

| 3,377,274 | 4/1968 | Burke et al. | 210/54 |
| 3,484,837 | 12/1969 | Odom et al. | 210/52 |
| 3,691,086 | 9/1972 | Lees et al. | 210/53 |
| 3,855,299 | 12/1974 | Witt | 210/43 |
| 4,059,515 | 11/1977 | Fowler et al. | 210/43 |

FOREIGN PATENT DOCUMENTS

| 1012918 | 6/1977 | Canada | 210/54 |
| 5055155 | 5/1975 | Japan | 210/54 |
| 5170964 | 6/1977 | Japan | 210/51 |

*Primary Examiner*—Peter A. Hruskoci
*Attorney, Agent, or Firm*—Elliot M. Olstein

[57] ABSTRACT

Water, containing dispersed fats, oils and greases is treated with a water soluble melamine-formaldehyde product to effect coagulation or flocculation thereof to a product which does not stick to surfaces. Such treatment is further enhanced by the addition of a water soluble polyacrylamide.

7 Claims, 1 Drawing Figure

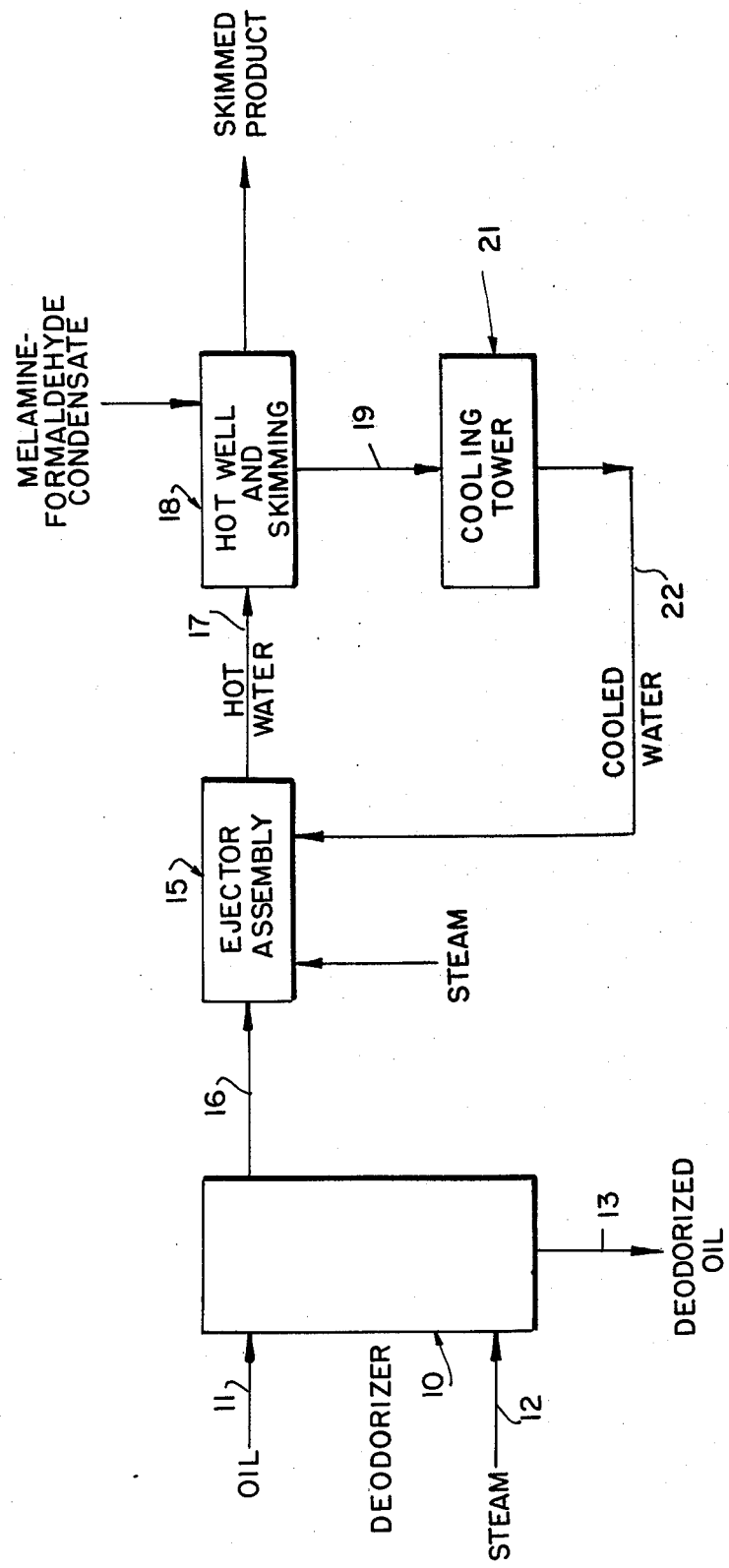

TREATMENT OF WATER CONTAINING FATS, OILS AND GREASES

This is a continuation, of application Ser. No. 854,462, filed Nov. 23, 1977 now abandoned.

This invention relates to water treatment, and more particularly to the treatment of water contaminated with fats and/or oils and/or greases.

In many water systems, fats and/or oils and/or greases are present as a contaminant. Such fats, oils and greases are liquid-like products which are dispersed in the water, either in soluble or emulsified form. Thus, for example, in many cooling water systems, fats, oils and greases are present as a contaminant which become deposited on solid surfaces thereby coating, fouling and clogging the system. As a result, there is a need to provide for effective treatment of such water in order to prevent such fats, oils and greases from becoming deposited on the solid surfaces.

In accordance with the present invention, water contaminated with fats and/or oils and/or greases is treated with an effective flocculating or coagulating amount of a water soluble melamine-formaldehyde condensation product to effect flocculating of such fats, oils and greases and thereby provide a flocculated or coagulated product which does not adhere to solid surfaces.

In accordance with a particularly preferred embodiment of the present invention, the water soluble melamine-formaldehyde condensation product is added to the water containing fats and/or oils and/or greases in combination with a water soluble polyacrylamide polymer in that it has been found that the polyacrylamide polymer enhances the flocculating ability of the melamine-formaldehyde condensation product.

The term "water soluble" as used herein means that the component is soluble in the water in an amount which is effective to provide for the coagulation or flocculation.

The melamine-formaldehyde condensation product is a product which is well known in the art. Thus, as known in the art, melamine reacts with formaldehyde to provide a condensation product. As known in the art, the formaldehyde and melamine initially react to provide methylol derivatives, which on further heating further condense to provide a resin product. The condensation products employed in the present invention are those which have not polymerized to a degree by which such condensation products are rendered water insoluble. Thus, the melamine-formaldehyde condensation products employed in the present invention are those which have been polymerized or resinified to a degree whereby the water solubility thereof is retained.

The fats, oils and greases found as contaminants in various aqueous systems are liquid or liquid-like products and all or a portion thereof are dissolved or emulsified in the water. A portion of the fats, oils and greases may also be present as a separate or floatable phase. It is the dissolved or emulsified fats, oils and greases which present the greatest problem in that the floatable or non-dispersed fats, oils and greases can be separated from the system; e.g., by skimming. It is to be understood, however, that such non-dispersed fats, oils and greases represent a potential problem in that they can become dispersed in the water, i.e., dissolved or emulsified. The invention is particularly applicable to animal and/or vegetable fats and oils.

In accordance with the present invention, the dispersed fats, oils and greases are coagulated and flocculated in the water and such flocculated fats, oils and greases do not deposit on solid surfaces. Moreover, it has been found that the resulting flocculated fats, oils and greases which are in the water system can be broken with agitation and subsequently reformed when agitation is stopped. This ability to break up and reform is important to the operating efficiency of a cooling system in that it permits the flocculated fats, oils and greases to pass through the system without any detrimental effects. Thus, for example, such flocs can pass through pumps, piping, spray nozzles, towers, etc. without becoming deposited on the surfaces and without effecting clogging thereof.

The melamine-formaldehyde condensation product is added to the water in an effective flocculating amount. The effective amount will vary with the amount of fats, oils and greases present in a particular system and with the nature of the system. The amount required for a particular system can be determined on a small laboratory scale; however, in general, the water soluble melamine-formaldehyde condensation product is added to the system in an amount of at least 50 ppm and in general from about 50 to about 2,000 parts per million, and preferably from about 100 to about 1,000 parts per million, all by weight. It is to be understood that higher amounts could be employed. In general, higher dosages are employed during the initial treatment to effect initial coagulation or flocculation of the fats, oils and greases; e,g., in amounts of from 1,000 to 2,000 ppm. After the initial treatment, the system may be maintained in a clean condition by the use of lower dosage amounts; e.g., 50 to 400 ppm, which can be added on a continuous or intermittant basis. The condensation product may be conveniently added as an aqueous solution.

It has been found that the use of a water soluble melamine-formaldehyde condensation product for flocculating fats, oils and greases dispersed in water does not require rigid pH control. In general, the pH should be from about 3.0 to about 8.0 in that in some cases, at a pH of above 8 some fats, oils and greases may become redissolved in the water and may become deposited on solid surfaces. In some cases, the pH can be as high as 9.5 or higher; however, in general, a pH of above 9.5 should not be used. A pH value of lower than 3 may result in degradation of the melamine-formaldehyde condensation product, and is generally also avoided. In most cases, however, in water systems which have fats, oils and greases present as a contaminant, the pH is within the range of from about 5.0 to about 6.5.

The water soluble melamine-formaldehyde condensation product may be added to a cooling water system at any one of a wide variety of points in the system; however, it has been found that the addition at the suction side of the circulation pump is particularly preferred. Similarly the water soluble melamine-formaldehyde condensation product can be used continuously or on a batch basis. It has been found that the use of the water soluble melamine-formaldehyde condensation product can result in the removal of 98% or more of the original fats, oils and greases present in the water.

As hereinabove noted, in accordance with a preferred embodiment, a water soluble acrylamide polymer is added to the water in conjunction with the water soluble melamine-formaldehyde condensation product. In general, such polyacrylamide is added at a dosage rate of from 0.25% to 0.50% of the water soluble melamine-formaldehyde condensation product. The acrylamide polymer may be added to the system before or after or with the water soluble melamine-formaldehyde condensation product; however, improved flocculation has been found to result if the polyacrylamide is added to the system subsequent to the addition of the melamine-formaldehyde condensation product. The acrylamide polymer is preferably a homopolymer; however, copolymers may also be employed.

The flocculated or coagulated fats, oils and greases may be removed from the system in any one of a wide variety of ways in order to prevent build-up of the floc. Thus, the floc can be separated by settling, filtration, centrifugation, etc., or by purging a portion of the water, containing floc, from the system.

The present invention may be employed in any one of a wide variety of aqueous systems in which fats and/or oils and/or greases are present as a contaminant, and is particularly applicable to cooling water systems. Thus, for example, the present invention has been found to provide particularly good results in the cooling water system employed in the deodorization process for fats and oils. In such systems, the fat, oil and grease contaminants generally enter the cooling water system in the barometric condenser. It is to be understood, however, that the present invention is not to be limited to such applications.

The invention will be further described with respect to a system for deodorization of fats and/or oils; however, the scope of the invention is not to be limited thereby. Such system is shown in the accompanying drawing, wherein:

The drawing is a simplified schematic flow diagram of a portion of the cooling water system for a deodorization process.

Referring now to the drawing, a vegetable or animal oil to be deodorized is introduced into a steam deodorizer 10 through line 11 wherein the oil is contacted with stripping steam introduced through line 12. The deodorizer is operated at conditions known in the art; temperatures in the range of 400°–475° F. and under vacuum. The deodorized oil is recovered through line 13.

Vapor is withdrawn from deodorizer 11 and into the steam ejector system 15 including appropriate barometric condensor(s), through line 16. The steam ejector system is operated as known in the art.

Hot water, containing fats and/or oils and/or greases withdrawn from the ejector assembly 15 through line 17 is introduced into a hot well and skimming equipment, generally indicated as 18. Melamine-formaldehyde condensate can be added to the water in this portion of the overall system; however, other points of addition are also possible. Flocculated or coagulated contaminants can also be separated in this portion of the system.

Hot water in line 19 is introduced into cooling tower 21, and cooled water returned to the ejector assembly through line 22.

The hereinabove equipment described with reference to the drawing is only illustrative, and the invention is not limited to such an embodiment. Thus, the invention is applicable to a wide variety of deodorization processes and is also applicable to removal of contaminants in processes other than deodorization.

The present invention will be further described with respect to the following example; however, the scope of the invention is not to be limited thereby:

EXAMPLE

The treatment of the present invention was effected on the cooling water system employed in a deodorization process for fats and oils. Prior to effecting treatment, the floatable fats, oils and greases were skimmed from the water to the degree possible.

1,425 pounds of a solution of a melamine-formaldehyde condensation product; 8% active concentration (114 lbs.) was added to the water system over a three hour period (dosage: 950 ppm of solution). The fat, oil and grease content was reduced from an initial content of 915 ppm to a content of 90.6 ppm. The floc did not adhere to the surfaces of the system and broke down in transfer pumps and reformed. The floc was easily removed by a skimmer system. Laboratory tests indicated that the use of about 150 more pounds of the condensation product would have removed most of the remaining fats, oils and greases.

The present invention is particularly advantageous in that it is possible to reduce the fat, oil and grease content of water contaminated therewith to 1.0 ppm and less. In general, such fats, oils and greases are present as contaminants in amounts of from 500 to 5000 ppm and in some cases in higher amounts. In addition, such treatment prevents coating and clogging of the system with such fats, oils and greases. Moreover, such treatment is effected without rigorous control of conditions.

These and other advantages should be apparent from the above teachings.

Numerous modifications and variations of the present invention are possible in light of the above teachings and, therefore within the scope of the appended claims, the invention may be practised otherwise than as particularly described.

What is claimed is:

1. In a process for deodorizing a member selected from the group consisting of animal and vegetable fats and oils wherein cooling water employed in said process contains soluble and/or emulsified contaminants selected from the group consisting of animal and vegetable fats, oils and greases, the improvement comprising:

adding to said cooling water an effective flocculating amount of a water soluble melamine-formaldehyde condensation product to effect flocculation of said contaminant.

2. The process of claim 1 wherein the pH of the water is from 5.0 to 6.5.

3. The process of claim 2 wherein the melamine-formaldehyde condensation product is added in an amount of from 100 to 1000 ppm.

4. The process of claim 1 wherein the melamine-formaldehyde condensation product is added in an amount of from 100 to 1000 ppm.

5. The process of claim 1 wherein the melamine-formaldehyde condensation product is added in an amount of at least 50 ppm.

6. The process of claim 5 wherein a water soluble acrylamide polymer is further added to the water.

7. The process of claim 6 wherein the acrylamide polymer is added in an amount of from 0.25 to 0.50% of the melamine-formaldehyde condensation product.

* * * * *